(12) United States Patent
Buck et al.

(10) Patent No.: US 11,757,142 B2
(45) Date of Patent: Sep. 12, 2023

(54) BATTERY ASSEMBLY WITH TEMPERATURE CONTROL DEVICE

(71) Applicant: EnerDel, Inc., Greenfield, IN (US)

(72) Inventors: Derrick S. Buck, Pendleton, IN (US); Robert N. Fattig, Anderson, IN (US); Bruce J. Silk, Indianapolis, IN (US)

(73) Assignee: EnerDel, Inc., Anderson, IN (US)

( * ) Notice: Subject to any disclaimer, the term of this patent is extended or adjusted under 35 U.S.C. 154(b) by 0 days.

(21) Appl. No.: 16/172,306

(22) Filed: Oct. 26, 2018

(65) Prior Publication Data

US 2019/0207276 A1     Jul. 4, 2019

Related U.S. Application Data

(63) Continuation of application No. 14/506,560, filed on Oct. 3, 2014, now Pat. No. 10,141,616, which is a (Continued)

(51) Int. Cl.
*H01M 10/00* (2006.01)
*H01M 10/613* (2014.01)
(Continued)

(52) U.S. Cl.
CPC ..... *H01M 10/613* (2015.04); *H01M 10/0525* (2013.01); *H01M 10/647* (2015.04); (Continued)

(58) Field of Classification Search
CPC ............. H01M 10/613; H01M 10/647; H01M 10/6551; H01M 10/6555; H01M 10/6561; (Continued)

(56) References Cited

U.S. PATENT DOCUMENTS

| 4,314,008 A | 2/1982 | Blake |
| 5,071,652 A | 12/1991 | Jones et al. |

(Continued)

FOREIGN PATENT DOCUMENTS

| CN | 1816271 A | 8/2006 |
| CN | 1905268 A | 1/2007 |

(Continued)

OTHER PUBLICATIONS

Amended claims submitted to the European Patent Office in Application 08857397.7, dated Jun. 29, 2011, 6 pgs.

(Continued)

*Primary Examiner* — Nicholas P D'Aniello
(74) *Attorney, Agent, or Firm* — Faegre Drinker Biddle & Reath LLP (57) ABSTRACT

A battery module of the present invention is adaptable to be utilized in various configurations including and not limited to an overlapping battery cell packaging configuration and a vertical stack battery cell packaging configuration used in an automotive and non-automotive applications. The battery module has a plurality of battery heatsink assemblies with the cells disposed therebetween. A plurality of rods extend through the each heatsink assemblies to secure the heatsink assemblies and the cell with one another to form the battery module.

24 Claims, 10 Drawing Sheets

Related U.S. Application Data continuation of application No. 12/746,689, filed as application No. PCT/US2008/013451 on Dec. 5, 2008, now Pat. No. 8,883,342.

(60) Provisional application No. 61/005,402, filed on Dec. 5, 2007.

(51) Int. Cl.
| | |
|---|---|
| *H01M 10/647* | (2014.01) |
| *H01M 10/6551* | (2014.01) |
| *H01M 10/6555* | (2014.01) |
| *H01M 10/6561* | (2014.01) |
| *H01M 10/6565* | (2014.01) |
| *H01M 10/6566* | (2014.01) |
| *H01M 50/103* | (2021.01) |
| *H01M 50/209* | (2021.01) |
| *H01M 10/0525* | (2010.01) |
| *H01M 10/623* | (2014.01) |

(52) U.S. Cl.
CPC ... *H01M 10/6551* (2015.04); *H01M 10/6555* (2015.04); *H01M 10/6561* (2015.04); *H01M 10/6565* (2015.04); *H01M 10/6566* (2015.04); *H01M 50/103* (2021.01); *H01M 50/209* (2021.01); *H01M 10/623* (2015.04); *H01M 2220/20* (2013.01); *Y02E 60/10* (2013.01); *Y02T 10/70* (2013.01)

(58) Field of Classification Search
CPC ......... H01M 10/6565; H01M 10/6566; H01M 2/1077; H01M 2/024; H01M 10/0525; H01M 10/623; H01M 2220/20; H01M 50/103; H01M 50/209; H01M 10/63; H01M 10/052; H01M 50/10; H01M 50/20; Y02E 60/122; Y02E 60/10; Y02T 10/7011; Y02T 10/70
See application file for complete search history.

(56) References Cited

U.S. PATENT DOCUMENTS

| | | | |
|---|---|---|---|
| 5,354,630 | A | 10/1994 | Earl et al. |
| 5,456,994 | A | 10/1995 | Mita |
| 5,879,831 | A | 3/1999 | Ovshinsky et al. |
| 6,001,504 | A | 12/1999 | Batson et al. |
| 6,117,584 | A | 9/2000 | Hoffman et al. |
| 6,255,015 | B1 | 7/2001 | Corrigan et al. |
| 6,368,743 | B1 | 4/2002 | Guerin et al. |
| 6,406,815 | B1 | 6/2002 | Sandberg et al. |
| 6,479,185 | B1 | 11/2002 | Hilderbrand et al. |
| 6,709,783 | B2 | 3/2004 | Ogata et al. |
| 6,729,908 | B2 | 5/2004 | Benson et al. |
| 6,821,671 | B2 | 11/2004 | Hinton et al. |
| 7,531,270 | B2 | 5/2009 | Buck et al. |
| 8,883,342 | B2 | 11/2014 | Buck et al. |
| 10,141,616 | B2 | 11/2018 | Buck et al. |
| 2004/0016455 | A1 | 1/2004 | Oogami |
| 2004/0021442 | A1* | 2/2004 | Higashino ......... H01M 10/6555 320/112 |
| 2004/0050414 | A1 | 3/2004 | Oogami |
| 2004/0086780 | A1 | 5/2004 | Ebermann |
| 2005/0089750 | A1 | 4/2005 | Ng et al. |
| 2005/0089751 | A1* | 4/2005 | Oogami ............ H01M 10/0468 429/162 |
| 2005/0100783 | A1 | 5/2005 | Ro et al. |
| 2005/0220682 | A1 | 10/2005 | McLean et al. |
| 2005/0255379 | A1 | 11/2005 | Marchio et al. |
| 2006/0090492 | A1 | 5/2006 | Ahn et al. |
| 2006/0169507 | A1 | 8/2006 | Inoue et al. |
| 2007/0018610 | A1 | 1/2007 | Wegner |
| 2007/0026301 | A1 | 2/2007 | Lee et al. |
| 2007/0037051 | A1* | 2/2007 | Kim .................. H01M 10/625 429/151 |
| 2007/0052390 | A1 | 3/2007 | Kim et al. |
| 2007/0132429 | A1 | 6/2007 | Onuki et al. |
| 2008/0090137 | A1 | 4/2008 | Buck et al. |
| 2008/0193838 | A1* | 8/2008 | Oh .................. H01M 50/24 429/175 |
| 2009/0023059 | A1 | 1/2009 | Kinoshita et al. |
| 2009/0053585 | A1 | 2/2009 | Nakazawa |
| 2010/0304203 | A1 | 12/2010 | Buck et al. |
| 2011/0104532 | A1 | 5/2011 | Buck et al. |

FOREIGN PATENT DOCUMENTS

| | | |
|---|---|---|
| JP | 2001-229897 A | 8/2001 |
| JP | 2005-347282 A | 12/2005 |
| JP | 2006-066322 A | 3/2006 |
| JP | 2007-115437 A | 5/2007 |
| WO | 2006/101342 A1 | 9/2006 |
| WO | 2006/101343 A1 | 9/2006 |
| WO | WO-2006101342 A1 * | 9/2006 .......... H01M 10/613 |
| WO | 2007/043392 A1 | 4/2007 |
| WO | 2007/094263 A1 | 8/2007 |

OTHER PUBLICATIONS

Claims submitted to the State Intellectual Property Office (SIPO) in Application No. 200880119088.1, Nov. 2013, 4 pgs.
English Translation of JP 2006066322 A.
Extended European Search Report and Opinion for Application No. 08846235.3, dated Jul. 3, 2012, 8 pgs.
International Preliminary Report on Patentability received for PCT Patent Application No. PCT/US2008/013451, dated Jun. 8, 2010, 6 pages.
International Search Authority, International Search Report and Written Opinion of the ISA, PCT/US2009/043459, dated Sep. 9, 2009, 7 pgs.
International Searching Authority (ISA), Written Opinion of the ISA, PCT/US2008/012545, dated Jan. 9, 2009.
International Searching Authority, International Search Report, PCT/US2008/012545, dated Jan. 9, 2009.
International Searching Authority, International Search Report, PCT/US2008/013451, dated Feb. 9, 2009.
Office Action issued by the Japanese Patent Office in Application 2010-533102, dated Apr. 16, 2013, 7 pgs.
Office Action issued by the State Intellectual Property Office (SIPO) in Application No. 200880119088.1, dated Aug. 27, 2013, 2 pgs.
Office Action issued by the State Intellectual Property Office (SIPO) in Application No. 200880119088.1, dated Jan. 27, 2014, 6 pgs.
Office Action issued by the State Intellectual Property Office (SIPO) in Application No. 200880119088.1, dated Oct. 17, 2012, 6 pgs.
Search Opinion issued by the European Patent Office in Application 08857397.7, dated Dec. 29, 2011, 5 pgs.

* cited by examiner

BATTERY ASSEMBLY WITH TEMPERATURE CONTROL DEVICE

RELATED APPLICATIONS

The present application is a continuation of U.S. patent application Ser. No. 14/506,560, filed Oct. 3, 2014, titled BATTERY ASSEMBLY WITH TEMPERATURE CONTROL DEVICE; which is a continuation of U.S. patent application Ser. No. 12/746,689, filed Jul. 7, 2010, now U.S. Pat. No. 8,883,342, titled BATTERY ASSEMBLY WITH TEMPERATURE CONTROL DEVICE; which is a national stage application of PCT/US08/13451, filed Dec. 5, 2008; which claims the benefit of U.S. Provisional Application Ser. No. 61/005,402, filed Dec. 5, 2007, the entire disclosures of which are expressly incorporated by reference herein.

FIELD OF THE INVENTION

The subject invention relates to battery packs having cells and more particularly, to a battery pack for electric/hybrid vehicles having a cooling system (or a heating system) for cooling (or heating) the cells within the battery pack and method of retaining the cells within the battery pack.

BACKGROUND OF THE INVENTION

Hybrid vehicles use multiple propulsion systems (gasoline and electric, battery powered motors) to provide motive power. When cruising or idling, some of the output of the combustion engine is fed to a generator (merely the electric motor(s) running in generator mode), which produces electricity to charge the batteries. These hybrid vehicles also recharge their batteries by capturing kinetic energy via regenerative braking. This contrasts with all-electric cars which use batteries charged by an external source such as the grid, or a range extending trailer. Nearly all hybrid vehicles still require gasoline as their fuel source though diesel and other fuels such as ethanol or plant based oils have also seen occasional use.

Electric batteries and cells comprise electrodes and an ion conducting electrolyte positioned between them. Battery packs that contain lithium ion batteries are increasingly popular with automotive applications and various commercial electronic devices because they are rechargeable and have no memory effect. Operating the lithium ion battery at an optimal operating temperature is very important to the batteries performance and lifespan.

Due to the characteristics of lithium ion batteries, they are typically specified operate-within an approximate ambient temperature range of –30° C. to 60° C. However, even when operating within this temperature range, a battery pack may begin to lose its capacity or ability to charge or discharge should it remain at the extremes for long periods of time. Nonetheless, it may be unavoidable that the lithium ion battery be used where the ambient temperature falls outside the temperature range.

Significant temperature variances can occur from one cell to the next, which is detrimental to performance of the battery pack. To promote long life of the entire battery pack, the cells must be below a desired threshold temperature. To promote pack performance, the differential temperature between the cells in the battery pack should be minimized. However, depending on the thermal path to ambient, different cells will reach different temperatures. Further, for the same reasons, different cells reach different temperatures during the charging process. Accordingly, one cell is at an increased temperature with respect to the other cells, its charge or discharge efficiency will be different, and, therefore, it may charge or discharge faster than the other cells. This will lead to a decline in the performance of the entire pack.

The art is replete with various designs of the battery packs with cooling and packaging systems. For example, U.S. Pat. No. 5,071,652 to Jones et al. teaches a metal oxide-hydrogen battery including an outer pressure vessel of circular configuration that contains a plurality of circular cell modules disposed side-by-side.

There is a need for an improved battery assembly with improved cooling and heating system adaptable to maintain the battery assembly at the optimal operating temperature to ensure the longest possible life cycle, with rated capacity, and charge and discharge rates.

SUMMARY OF THE INVENTION

A battery module of the present invention is adaptable to be utilized in various configurations including and not limited to horizontally or vertically stacked battery cell packaging configurations used in automotive and non-automotive applications. The battery module has a multiplicity of cells each adjacent to a respective heat sink-formed from thermally conductive materials such as, for example, flat stock aluminum alloy foils and the like.

A plurality of first electrodes and second electrodes are stacked and packaged into an electrical insulating envelope to form a cell. Alluding to the above, each heat sink presents a plate formed from thermally conductive materials. The plate defines thermal transfer edges and terminal ends. Each plate defines as cut out portion and a spacer engaging said cut out portions. Each plate includes a plurality of holes to receive a plurality of rods extending therethrough to interconnect the heat sinks with one another to form the battery pack. One of the terminal ends extends into a fin presenting a first configuration having a rectangular cross section. The other terminal end extends into another fin presenting a second configuration having an L-shaped cross section. The fins may be cold formed and are designed to transfer heat either to or from the cells depending on application. A cell retaining device is connected with each heat sink. The cell retaining device includes an inner frame set and an outer frame set. The inner frames of each cell retaining device sandwich the heat sink therebetween. The inner and eater frames present a plurality of male and female connecting features that mechanically engage with one another to lock the prismatic cell within the inner and outer frames. These features can be disengaged to allow for the removal of the prismatic cell for disassembly purposes. This describes a cell retaining and heat transfer assembly.

A device, such as a layer of material, such as foam or any other non-rigid polymeric material, is sandwiched between the prismatic cells. The device substantially covers the prismatic cells. Each heal sink has a pair of inner frames and is connected to the opposite sides of the heat sink and mechanically engages the respective outer frames having the respective prismatic cells in between to form a cell retaining and heal transfer assembly. This device is sandwiched between at least two of these assemblies which are mechanically stacked and electrically connected to one another to form the battery pack. As the assemblies are combined to form the battery pack, the device allows expansion and contraction of the prismatic cells during typical charge and discharge states therefore causing the cell to maintain intimate contact with the heat sink for efficient thermal transfer.

A plurality of the battery packs is housed in a dish or support tray. The dish is supported by a floor pan assembly or other part of the vehicle (not shown). The dish presents a base and a plurality of side walls. The side walls are generally perpendicular to the base and may be slightly inclined. A peripheral lip extends from each wall. The walls may also extend parallel to a bridge extending between the walls. The bridge includes a top portion and side walls extending generally perpendicular to the side walls. The bridge divides the dish into two sections to house a plurality of the modules. The side walls present a plurality of slots to allow fluid to escape from the dish.

First and second brackets are integral with and extend from the walls and are aligned with the top portion. The brackets may or may not be identical. Each bracket includes an airflow cheek valve features connected to a biasing element thereby allowing to actuate as the valve features open or close eased on park pressure. When cooling air is required, pressure from a fan system that opens the inlet valve. When the pressure is no longer present, the spring tension closes the valve. If the pack experiences internal overpressure, the inlet valve will be closed and the exhaust valve will be opened. The inlet valve additionally serves to keep fumes and gases from a thermal event from entering the passenger compartment.

An advantage of the present invention is to provide a battery pack having excellent retention surrounds and secures the cells.

Another advantage of the present invention is to provide a battery pack that reduces manufacturing costs due to simplified assembly methods.

Still another advantage of the present invention is to provide a means to thermally manage the battery pack to deliver and receive high rates of current by efficiently removing undesired heat during the rapid charge or discharge pulse that may negatively impact the performance and life span of the battery pack.

Still another advantage of the present invention is to provide a pack that is simple in design and has a reduced mass.

Still another advantage of the present invention is to provide a battery pack that is easily expandable for varying applications.

DETAILED DESCRIPTION OF THE PREFERRED EMBODIMENT

Figure 1:
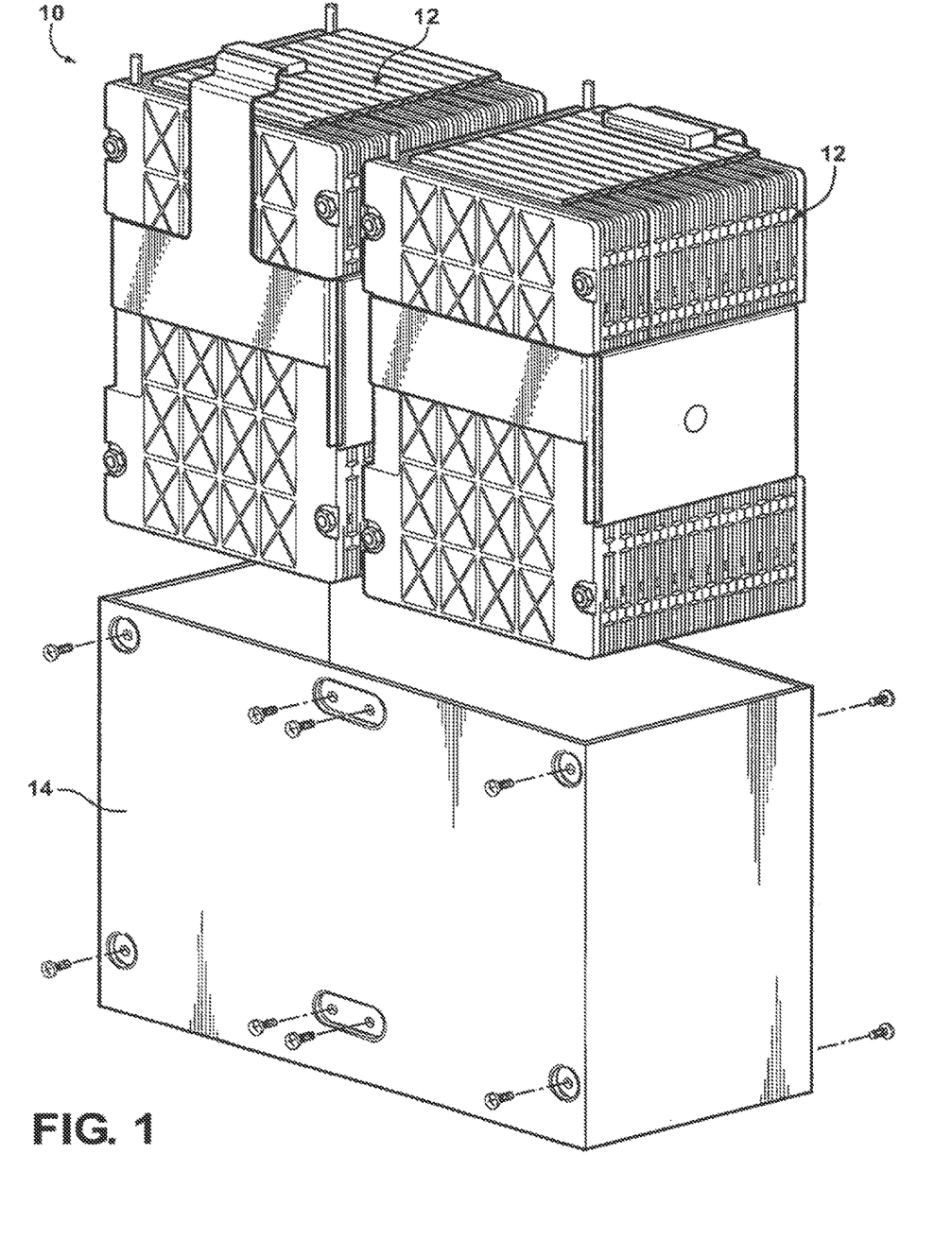
FIG. 1 is a perspective view of the battery module having a pair of battery packs.
Figure 2:
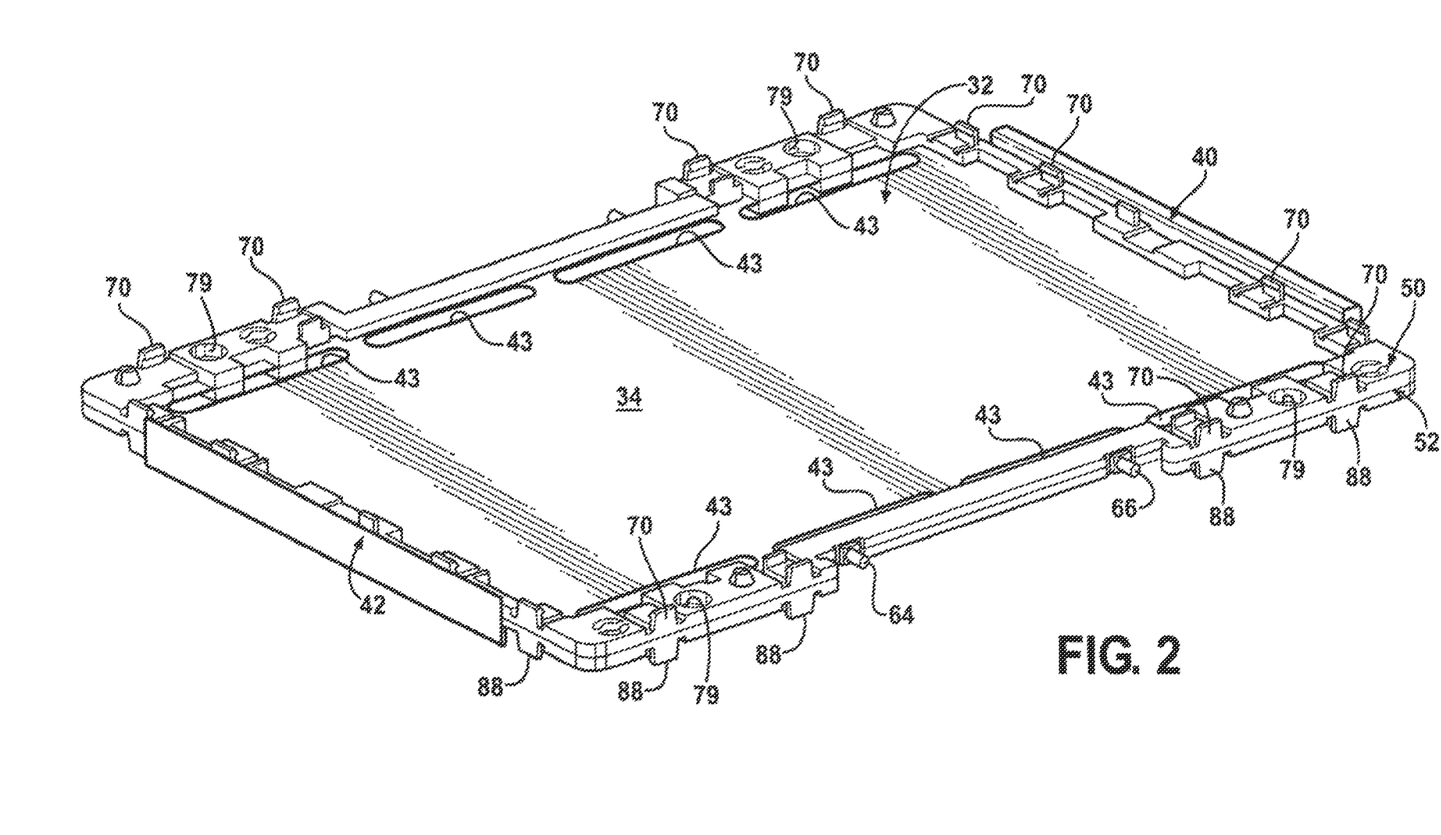
FIG. 2 illustrates a heat sink sandwiched between a pair of inner frames.
Figure 3:
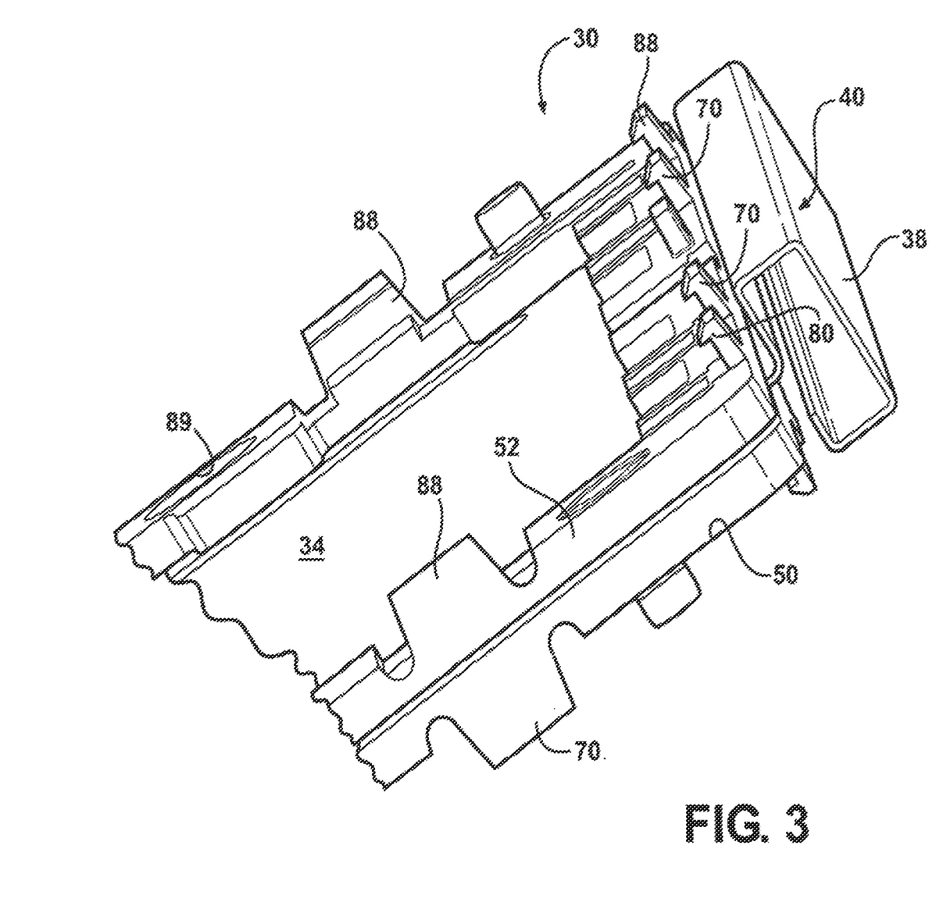
FIG. 3 is a fragmental perspective view of the heat sink sandwiched between the inner frames as shown in FIG. 2.

Referring to the Figures, wherein like numerals indicate like or corresponding parts, a battery assembly of the present invention is generally indicated at 10 in FIG. 1 having a pair of battery packs, generally indicated at 12, disposed in a housing 14. The battery pack 12 is adaptable to be utilized in various configurations including and not limited to a horizontally or vertically stacked battery cell packaging configuration used in automotive vehicle applications or non-automotive applications. Each battery pack 12 includes a plurality of cells (not shown in FIG. 1). The cells are better show 1 in FIG. 6. Preferably, each cell 16 is a lithium ion cell having a prismatic configuration.

Figure 6:
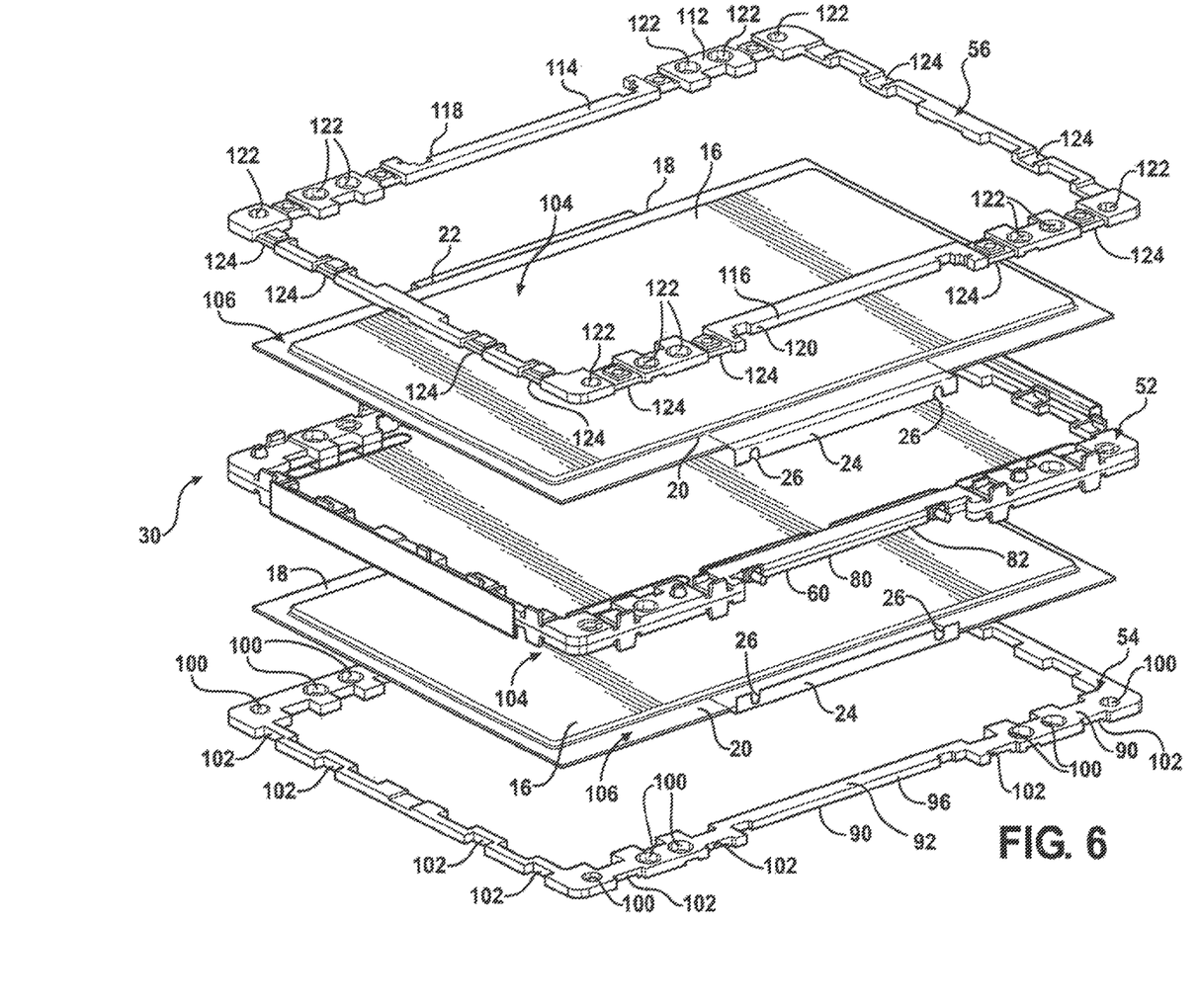
FIG. 6 is an exploded view of the cell retaining element shown in FIG. 5.

Referring to FIG. 6, each cell 16 presents side edges 18 and 20. A first terminal or first bend 22 presents a positive terminal and extends from one of the edges 18. A second terminal or bend 24 presents a negative terminal extending from the other edge 20. Each bend 22 and 24 defines an angle of at least ninety degrees. The angle may vary at its degree and may be configured to be up to ninety degrees. Alternatively, the first and second terminals may present a planar configuration. Each bend 22 and 24 presents a pair of semicircular openings 26.

Figure 7:
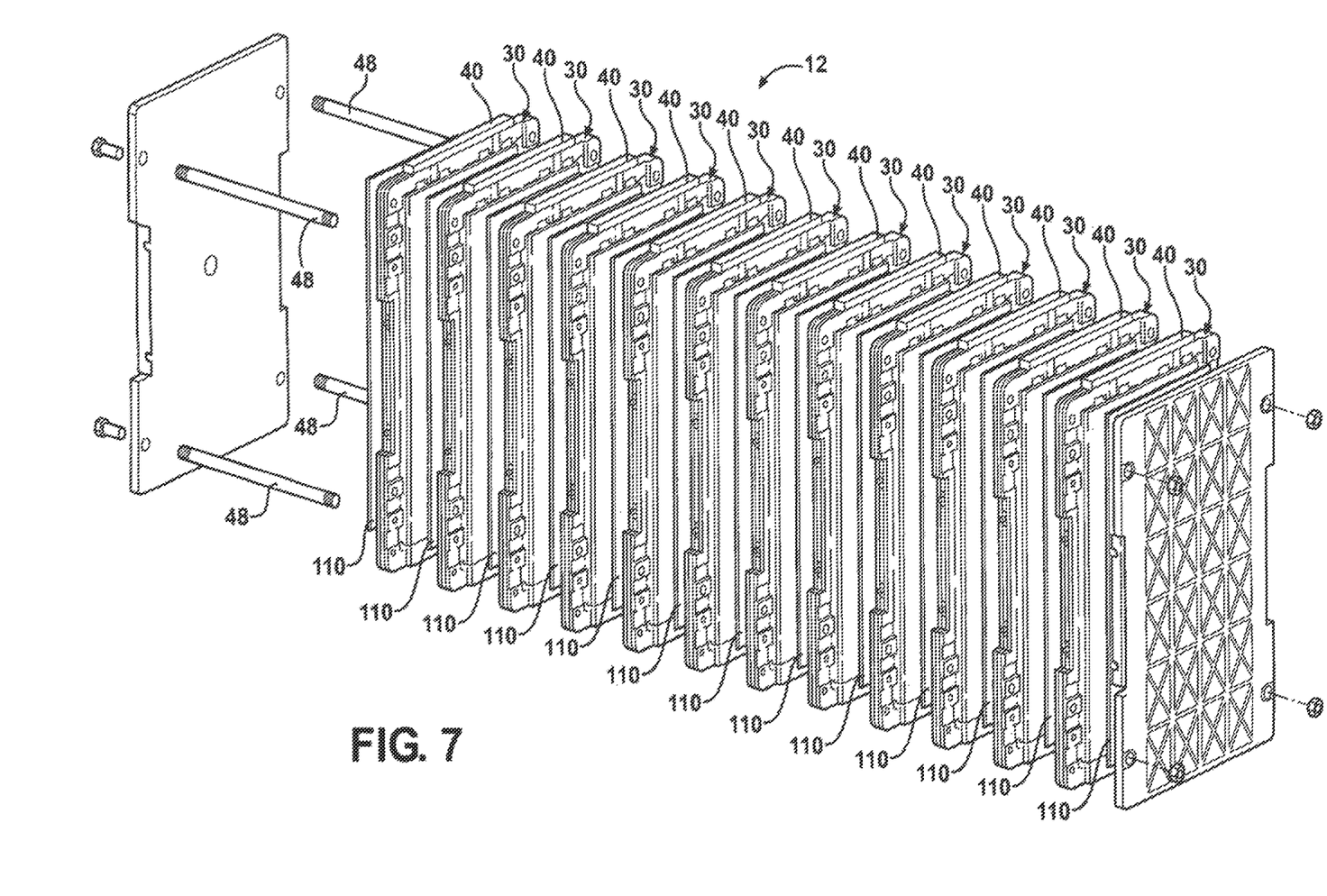
FIG. 7 is a perspective and exploded view of one of the battery module including a plurality of the cell retaining elements.

Referring now to FIGS. 2 through 6, each battery pack includes a plurality of cell retaining elements, generally shown at 30, removeably connected with one another to form the battery pack 12. FIG. 7 illustrates an exploded view of the battery pack 12. The cell retaining element 30 (See FIGS. 2 and 4) includes a heat sink 32. The heat sink 32 presents a plate 34 formed from a thermally conductive material such as aluminum, copper, and the like. Each heat sink 32 terminates to oppositely spaced from one another fin portions, generally indicated at 36 and 38 in FIG. 4. The fin portion 38 presents a rectangular or tubular cross section 40. The other fin portion 36 presents a flat surface 42. The fin portions 36 and 38 may include a gate shape, may be pleated, planar, may present a plurality of slots or holes, may be formed as a bend to provide a thermal interface plane for an external heating or cooling device including but not limited to beater blankets and or cooling elements. Fin portions 36 and 38 provide surface are for cooling or heating. Media, such as liquids, solids, or gasses, and the like, may be introduced to the fin portions 36 and 38. The plate 34 includes a plurality of slots 43 and semicircular cut outs 44 at the sides 46 of the plate 34 to receive a plurality of rods 48 (see FIG. 7) extending therethrough to interconnect the cell retaining elements 30 with one another to form the battery pack 12.

A frame assembly of the cell retaining element is shown in FIGS. 4 through 7. Each frame assembly includes a first set of inner frames 50 and 52 securing the plate 34, sandwiched between the inner frames 50 and 52, and a second set of outer frames 54 and 56 for securing the cells 16. One of the cells 16 is secured between one of the inner frames 50 and one of the outer frames 54. The other inner and outer 52 and 56 secure another of the cells 16 (See FIG. 6).

Figure 4:
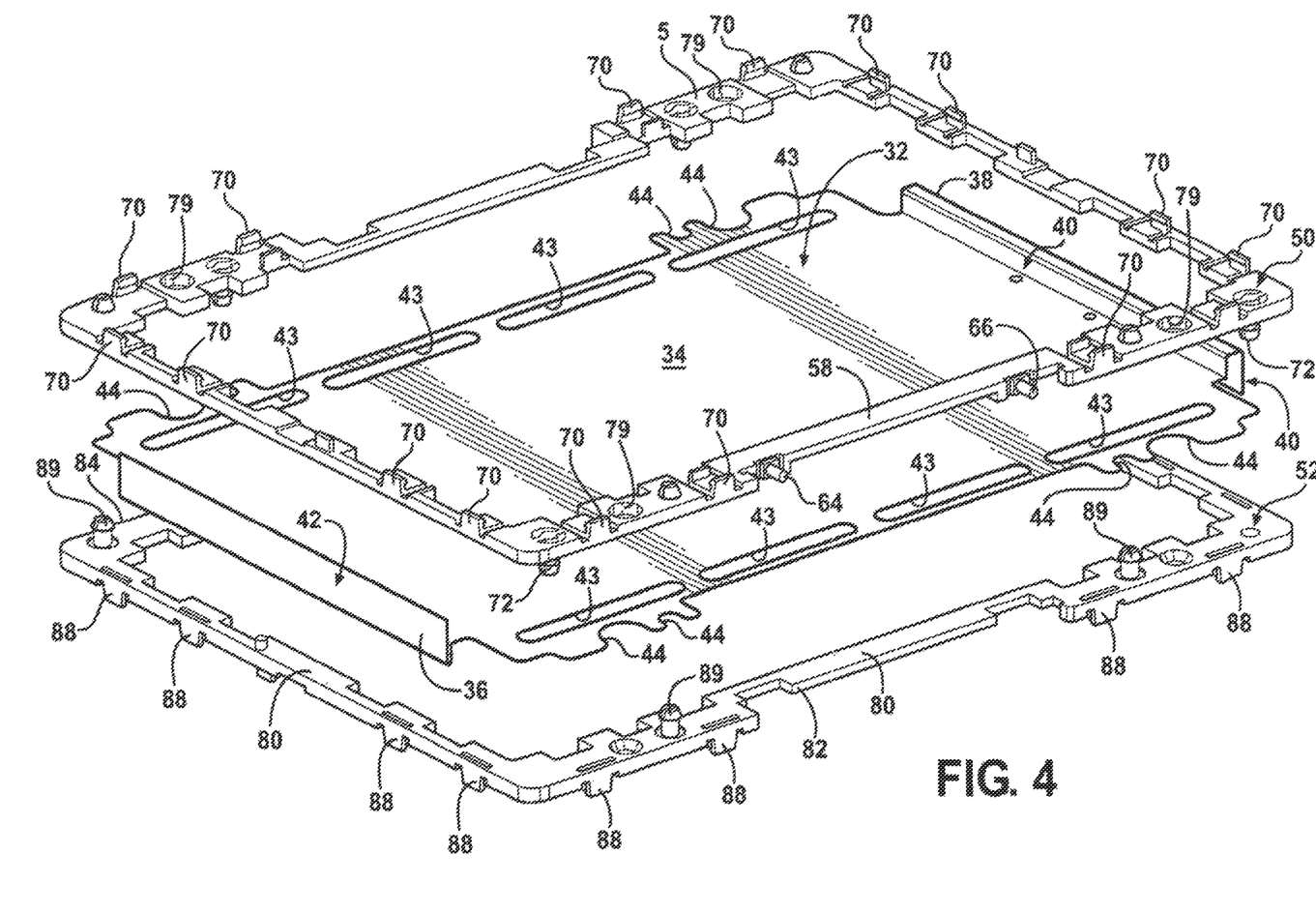
FIG. 4 is an exploded view of FIG. 2.
Figure 5:
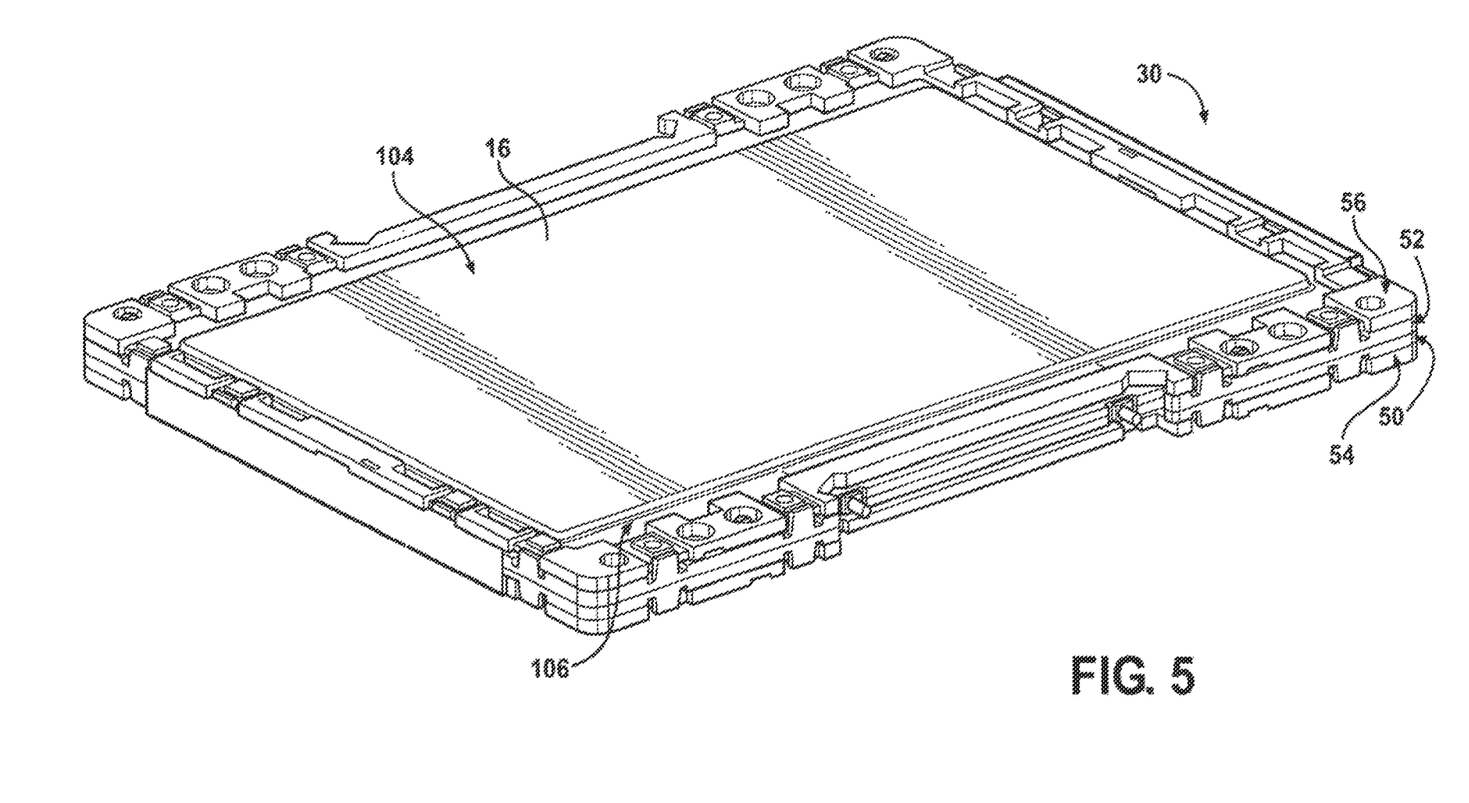
FIG. 5 is a perspective view of a cell retaining element having the heat sink sandwiched between the inner frames, a pair of prismatic cells positioned on opposite sides of the heat sink with each prismatic cell extending over the respective inner frames and a pair of outer frames each extending over the respective prismatic cell.

As best shown in FIG. 4, one of the inner frames 50 presents a peripheral edge 58 and side walls 60 and 62 (see FIG. 6). One of the side walls 62 includes a pair of pins 64 and 66 to engage the bends 22 or 24 of the cells 16. A plurality of holes or female connectors (not shown) is defined in the inner frame 50. A plurality of mate connectors or hooks 70 are formed and integrally extend from and about the peripheral edge 58 of the inner frame 50 (see FIG. 2). The hooks 70 extend in the opposite direction and away from the plate 34. A plurality of studs 72 extends from the inner frame 50 in the direction opposite from the hooks 70 to mechanically engage another inner frame 52 and the plate 34 sandwiched therebetween.

As best illustrated in FIG. 6, another inner frame 52 presents a configuration similar to the configuration of inner frame 52. The inner frame 52 includes a peripheral edge 80 and side walls 82. One of the side walls 82 may also includes a pair of pins (not shown) to engage the bends 22 or 24 of the cells 16. A plurality of holes or female connectors 86 is defined in the frame 52. A plurality of male connectors or hooks 88 is formed and integrally extend from and about the peripheral edge 58 of the frame 50. The hooks 88 extend away and perpendicular to the plate 34. A plurality of studs 89 extend from the inner frame 52 in the direction opposite from the hooks 88 to mechanically engage the mace frame 50 and the plate 34 sandwiched therebetween. The frames 50 and 52 are molded from a polymeric material.

As best shown in FIG. 6, one of the outer frames 54 presents a peripheral edge 90 and side walls 92 each presenting cut out portions configured to engage the bends 22 and/or 24. A plurality of holes or female connectors 100 is defined in the frame 54. A plurality of female connectors 102 is formed in the peripheral edge 90 to engage the hooks 70 extending from the inner frame 50 in a snap interface to secure one of the prismatic cells 16 therebetween. The outer frame 54 and the inner frame 50 define an opening to surround the raised portions 104 of the cell 16 and sandwiched a peripheral lip portion 106 of the cell 16 therebetween. One of the raised portions 104 of each cell 16 frictionally engages the plate 34 while the other raised portion 104 frictionally engages the raised portion 104 of another cell 16 retained by adjacent cell retaining element, as best shown in FIG. 7.

As best shown in FIG. 7, a device or a layer of non-rigid polymeric material 110, is sandwiched between the raised portions 104 of the prismatic cells 16. The layer of material is preferably a polyester polyurethane foam. The device 110 substantially covers the raised portion 104 of the prismatic cell 16. Alternatively, the device 110 is sandwiched between the peripheral lip portion 106 of the cell 16 and the upper frame 54 to mechanically retain the device 110 with the cell retaining element 30. As the cell retaining elements 30 are assembled with one another to form the battery pack 12, the cell 16 of one cell retaining element 30 is placed adjacent the cell 16 of adjacent cell retaining clement 30 so that the device 110 is sandwiched between the prismatic cells. The device 110 allows expansion and contraction of the prismatic cells 16 during typical charge and discharge states therefore causing the cell 16 to maintain intimate contact with the heat sink 34 for efficient thermal transfer inside the battery pack 12 and/or battery assembly 10.

The other outer frame 56 presents a peripheral edge 112 and side walls 114 and 116 each presenting cut out portions 118 and 120 dimensionally configured to engage the bends 22 and/or 24. A plurality of holes or female connectors 122 is defined in the frame 56. A plurality of connectors 124 is formed in the peripheral edge 112 to engage the hooks 88 extending from the inner frame 52 to secure one of the prismatic cells 16 so that the hooks 88 snap fit onto the connectors 124. The outer frame 56 and the inner frame 52 define an opening to surround the raised portions 104 of another prismatic cell 16 and sandwich a peripheral lip portion 106 of the prismatic cell 16 therebetween.

One of the raised portions 104 of the prismatic cell 16 frictionally engages the plate 34 while the other raised port on 104 frictionally engages the raised portion 104 of another cell 16 retained by adjacent cell retaining element, as best shown in FIG. 7. The outer frames 54 and 56 are molded from a polymeric material.

Figure 8:
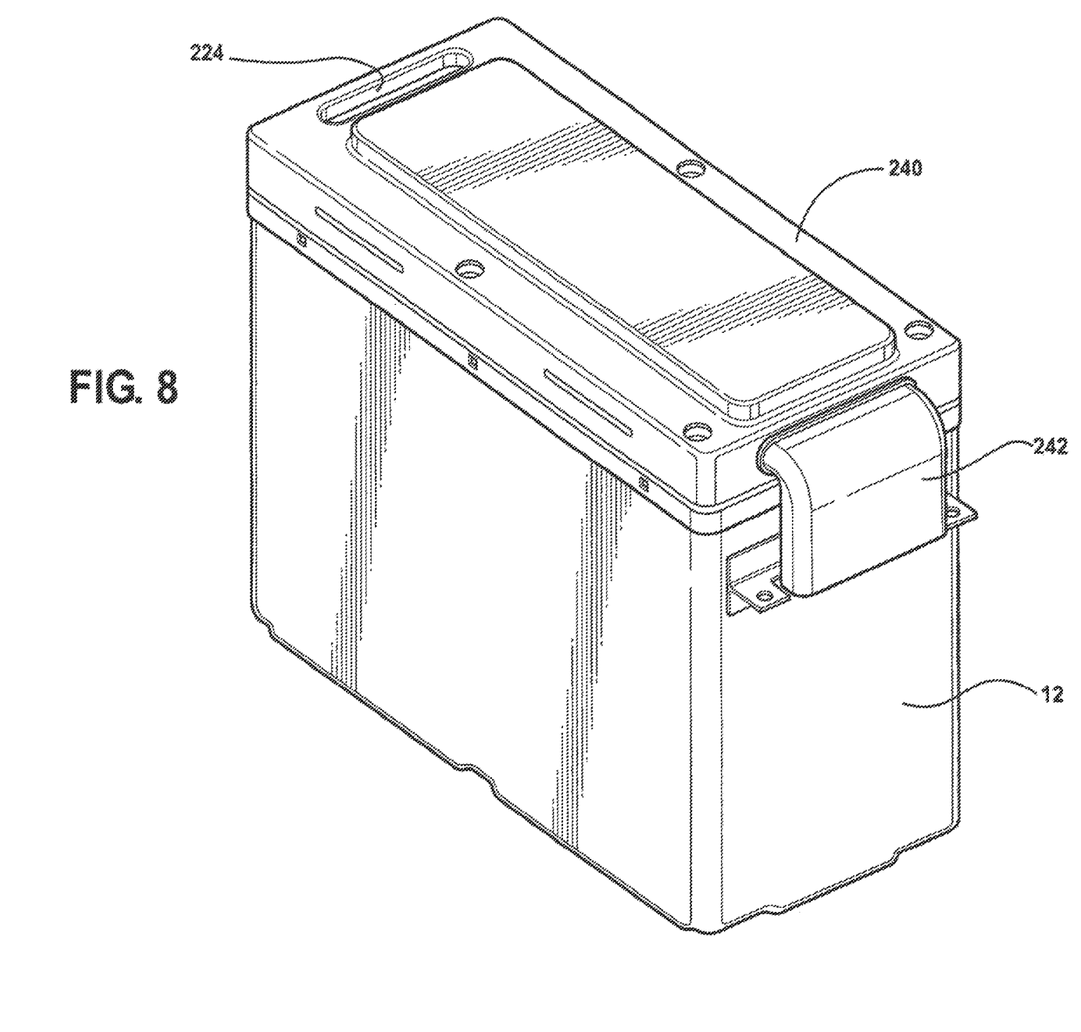
FIG. 8 is a perspective view of an alternative embodiment of the battery module having a cover with inlet and outlet ports.
Figure 9:
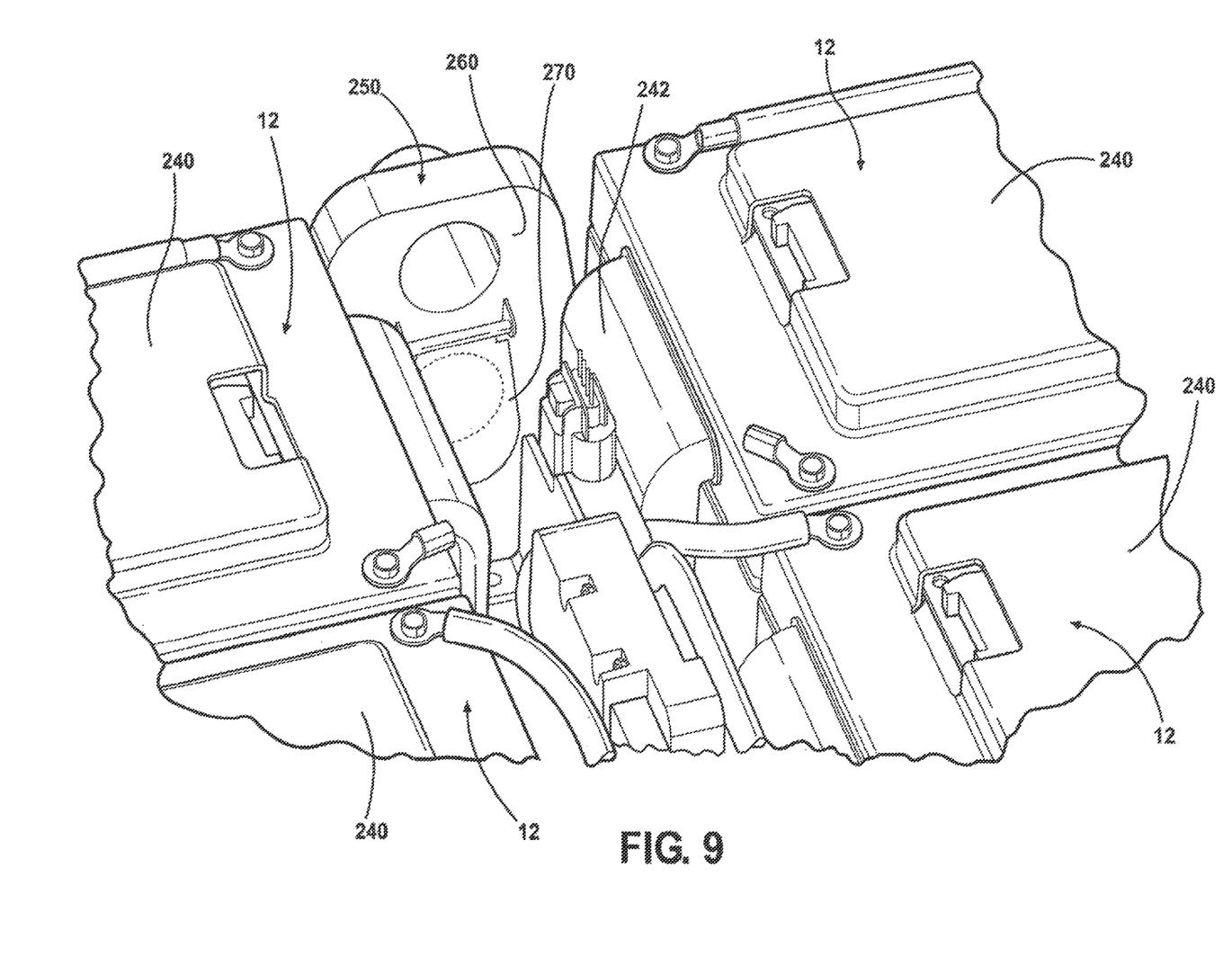
FIG. 9 is a cross sectional view of an extension portion of the dish portion having an inlet valve and an outlet valve to circulate fluid through the battery housing for manipulating the temperature of the cells of the battery packs.
Figure 10:
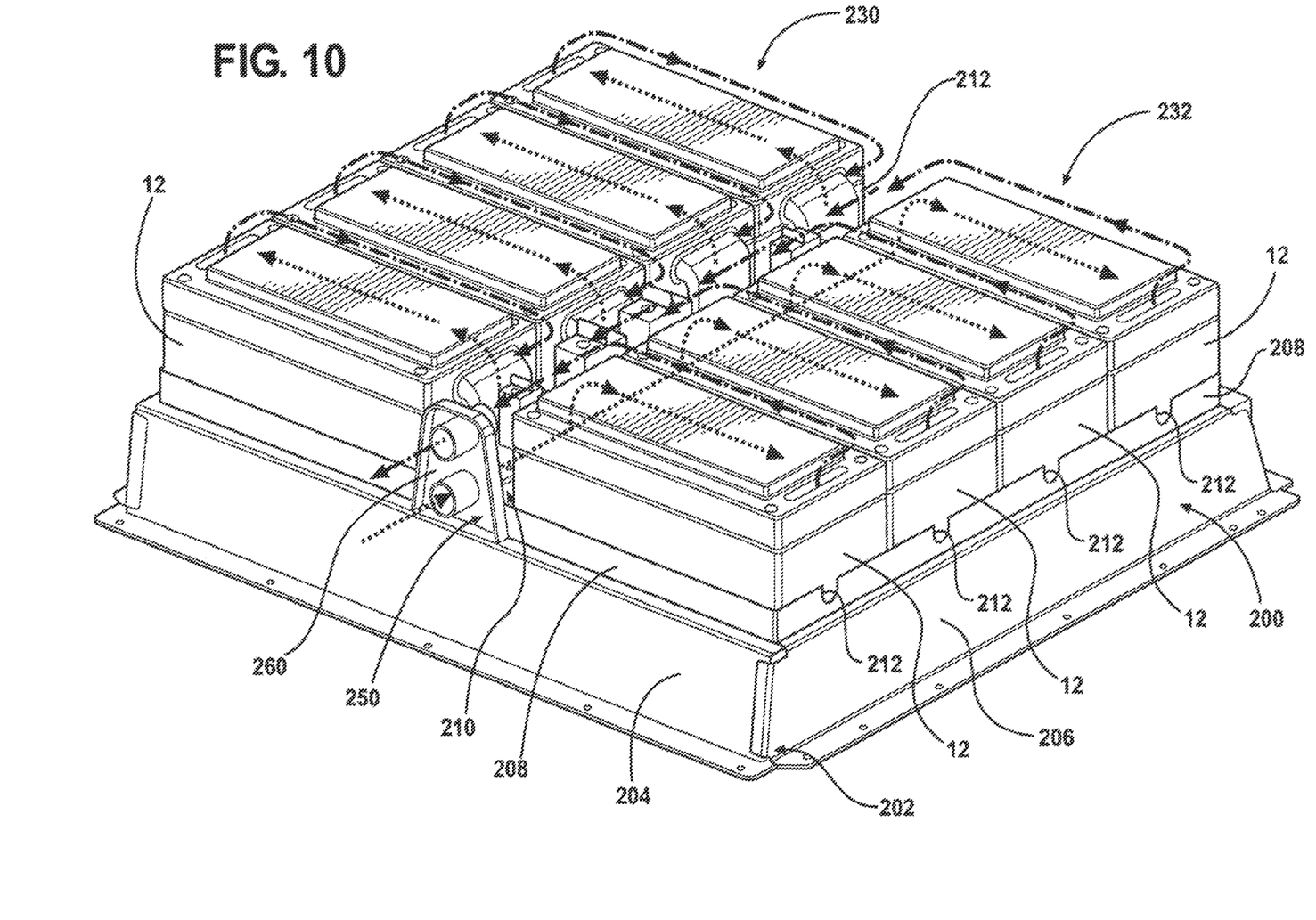
FIG. 10 is a perspective view of a dish portion of the battery housing a plurality battery modules and direction of air flow circulating about the battery modules.

As best shown in FIGS. 8 through 10, the battery packs 12 are housed in a dish or support tray, generally indicated at 200 (See FIG. 10). The dish 200 is supported by a floor pan assembly or other part of the vehicle (not shown). The dish presents a base 202 and a plurality of side walls (only two walls are shown in FIGS. 10 at 204 and 206) extending therefrom. The side walls 204 may be generally perpendicular to the base 202 and may be slightly inclined. A peripheral lip 208 extends from each wall 204 and 206. The walls 204 and 206 extend parallel to a bridge, generally indicated at 210. The lip 208 includes a plurality of first locking elements, such as tongues (not shown), extending from the battery packs 12 thereby securing the battery packs 12 within the dish 200.

Alluding to the above, the bridge 210 extends between the walls. The bridge 210 divides the dish 200 into two sections 230 and 232 to house a plurality of the battery packs 12. The bridge 210 present a plurality of slots (not shown) to provide fluid passage into the battery packs 12 having a cover portion 240 presenting an intake port 242 and an escape port defined by a slot 244. A valve device (only one is shown at 250 in FIGS. 9 and 10) are disposed in the base of the dish 200 and between the side walls.

First and second brackets (only one shown at 260) are integral with and extend from the wall 204 Each bracket 260 includes an airflow cheek valve features 270 connected to a biasing element thereby allowing as the valve 270 to open or close based on pack pressure.

While the invention has been described with reference to the preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope of the invention. Therefore, it is intended that the invention not be limited to the particular embodiment disclosed, but that the scope of the invention will be determined by the appended claims.

What is claimed is:

1. A battery assembly, comprising:
   a first prismatic cell, the first prismatic cell comprising a pair of opposite length sides extending along a cell length, and a pair of opposite width sides extending along a cell width, the first prismatic cell further defining a cell depth, the cell length longer than the cell width and the cell width longer than the cell depth, a first terminal of the first prismatic cell extending from a main body of the first prismatic cell, the first terminal of the first prismatic cell extending from one of the pair of length sides of the first prismatic cell, the main body comprising a raised central portion of the first prismatic cell;
   a frame comprising a plurality of intersecting frame segments defining a length of the frame, a width of the frame, and a depth of the frame, the length of the frame longer than the width of the frame and the width of the frame longer than the depth of the frame, a first lengthwise frame segment of the plurality of intersecting frame segments extending along the length of the frame, the first lengthwise frame segment presenting a first lengthwise frame segment peripheral edge having a first lengthwise frame segment cutout portion that extends the entirety of the depth of the frame and is recessed from the first lengthwise frame segment peripheral edge of the frame and sized to accommodate the first terminal extending from the main body of the first prismatic cell, the first terminal positioned in the first lengthwise frame segment cutout portion and recessed from the first lengthwise frame segment peripheral edge of the frame, the first lengthwise frame segment cutout portion overlapping a midpoint on the first lengthwise frame segment; and a heat sink frictionally engaging the raised central portion of the first prismatic cell, the heat sink comprising a plate formed from a thermally conductive material, wherein the plate terminates at a first end at a first fin portion and at a second end at a second fin portion, the first fin portion and the second fin portion both providing a thermal interface for a heat transfer device, the first fin portion and the second fin portion extending along the cell width.

2. The battery assembly of claim 1, wherein:
the plurality of intersecting frame segments of the frame defining a central opening sized to accommodate the raised central portion of the first prismatic cell, the raised central portion of the first prismatic cell occupying the central opening of the frame, the raised central portion of the first prismatic cell surrounded by the plurality of intersecting frame segments.

3. The battery assembly of claim 2, wherein the frame comprises a first inner frame, said battery pack further comprising:
a second inner frame,
the first inner frame secured to the second inner frame, with the heat sink trapped between the first inner frame and the second inner frame.

4. The battery assembly of claim 1, wherein the plate is formed from aluminum.

5. The battery assembly of claim 1, wherein the plate is formed from copper.

6. The battery assembly of claim 1, wherein the plurality of intersecting frame segments of the frame further comprises a second lengthwise frame segment extending along the length of the battery pack, the second lengthwise frame segment presenting a second lengthwise frame segment peripheral edge having a second lengthwise frame segment cutout portion sized to accommodate a second terminal extending from the main body of the first prismatic cell, the second terminal extending from the main body of the first prismatic cell in a direction opposite to the direction that the first terminal extends from the main body of the first prismatic cell, the second terminal positioned in the second lengthwise frame segment cutout portion and recessed from the second lengthwise frame segment peripheral edge of the frame.

7. The battery assembly of claim 3, further comprising:
a second prismatic cell, a first terminal of the second prismatic cell extending from a main body the second prismatic cell;
the second inner frame comprising a plurality of intersecting second inner frame segments defining a length of the second inner frame and a width of the second inner frame, the length of the second inner frame longer than the width of the second inner frame, a first lengthwise frame segment of the plurality of intersecting second inner frame segments extending along the length of the second inner frame, the first lengthwise frame segment of the plurality of intersecting second inner frame segments presenting a peripheral edge of the first lengthwise frame segment of the plurality of intersecting second inner frame segments having a cutout sized to accommodate the first terminal of the second prismatic cell, the first terminal of the second prismatic cell positioned in the cutout and recessed from the peripheral edge of the first lengthwise frame segment of the plurality of intersecting second inner frame segments, the second lengthwise frame segment cutout portion overlapping a midpoint on the second lengthwise frame segment.

8. The battery assembly of claim 3, further comprising:
a first outer frame secured to the first inner frame, with the first prismatic cell trapped between the first inner frame and the first outer frame.

9. The battery assembly of claim 7, further comprising:
a first outer frame secured to the first inner frame, with the first prismatic cell trapped between the first inner frame and the first outer frame; and
a second outer frame secured to the second inner frame, with the second prismatic cell trapped between the second inner frame and the second outer frame.

10. A battery assembly, comprising:
a first prismatic cell, the first prismatic cell comprising a pair of opposite length sides extending along a cell length, a pair of opposite width sides extending along a cell width, and a raised central portion, the first prismatic cell further defining a cell depth, the cell length longer than the cell width and the cell width longer than the cell depth, a positive terminal extending from a first one of the pair of length sides of the first prismatic cell along a first direction and a negative terminal extending from a second one of the pair of length sides of the first prismatic cell along a second direction opposite the first direction;
a frame comprising a plurality of intersecting frame segments defining a length of the frame, a width of the frame, and a depth of the frame, the length of the frame longer than the width of the frame and the width of the frame longer than the depth of the frame, a first lengthwise frame segment of the plurality of intersecting frame segments extending along the length of the frame, the first lengthwise frame segment presenting a first lengthwise frame segment peripheral edge having a first lengthwise frame segment cutout portion that extends the entirety of the depth of the frame and is recessed from the first lengthwise frame segment peripheral edge of the frame and sized to accommodate the positive terminal of the prismatic cell, the positive terminal of the prismatic cell positioned in the first lengthwise frame segment cutout portion and recessed from the first lengthwise frame segment peripheral edge of the frame, a second lengthwise frame segment of the plurality of intersecting frame segments extending along the length of the frame, the second lengthwise frame segment presenting a second lengthwise frame segment peripheral edge having a second lengthwise frame segment cutout portion that is recessed from the second lengthwise frame segment peripheral edge of the frame and sized to accommodate the negative terminal of the prismatic cell, the negative terminal of the prismatic cell positioned in the second lengthwise frame segment cutout portion and recessed from the second lengthwise frame segment peripheral edge of the frame; and a heat sink frictionally engaging the raised central portion of the first prismatic cell, the heat sink comprising a plate formed from a thermally conductive material, wherein the plate terminates at a first end at a first fin portion and at a second end at a second fin portion, the first fin portion and the second fin portion both providing a thermal interface for a heat transfer device, the first fin portion and the second fin portion extending along the cell width.

11. The battery assembly of claim 10, wherein the first lengthwise segment cutout portion overlaps a midpoint on the first lengthwise frame segment and the second lengthwise segment cutout portion overlaps a midpoint on the second lengthwise frame segment.

12. The battery assembly of claim 10, wherein:
the plurality of intersecting frame segments of the frame define a central opening sized to accommodate the raised central portion of the first prismatic cell, the raised central portion of the first prismatic cell occupying the central opening of the frame, the raised central portion of the first prismatic cell surrounded by the plurality of intersecting frame segments.

13. The battery assembly of claim 12, wherein the frame comprises a first inner frame, said battery pack further comprising:
a second inner frame,
the first inner frame secured to the second inner frame, with the heat sink trapped between the first inner frame and the second inner frame.

14. The battery assembly of claim 13, further comprising:
a second prismatic cell, a positive terminal extending from a first side of the second prismatic cell along a first direction and a negative terminal extending from a second side of the prismatic cell along a second direction opposite the first direction; and
the second inner frame comprising a plurality of intersecting second inner frame segments defining a length of the second inner frame and a width of the second inner frame, the length of the second inner frame longer than the width of the second inner frame, a first lengthwise frame segment of the plurality of intersecting second inner frame segments extending along the length of the second inner frame, the first lengthwise frame segment of the plurality of intersecting second inner frame segments presenting a first lengthwise frame segment peripheral edge having a first lengthwise frame segment cutout portion sized to accommodate the positive terminal of the second prismatic cell, the positive terminal of the second prismatic cell positioned in the first lengthwise frame segment cutout portion of the second inner frame and recessed from the first lengthwise frame segment peripheral edge of the second inner frame, a second lengthwise frame segment of the plurality of intersecting second inner frame segments extending along the length of the second inner frame, the second lengthwise frame segment of the plurality of intersecting second inner frame segments presenting a second lengthwise frame segment peripheral edge having a second lengthwise frame segment cutout portion sized to accommodate the negative terminal of the second prismatic cell, the negative terminal of the second prismatic cell positioned in the second lengthwise frame segment cutout portion of the second inner frame and recessed from the second lengthwise frame segment peripheral edge of the second inner frame.

15. The battery assembly of claim 13, further comprising:
a first outer frame secured to the first inner frame, with the first prismatic cell trapped between the first inner frame and the first outer frame.

16. The battery assembly of claim 14, further comprising:
a first outer frame secured to the first inner frame, with the first prismatic cell trapped between the first inner frame and the first outer frame; and
a second outer frame secured to the second inner frame, with the second prismatic cell trapped between the second inner frame and the second outer frame.

17. The battery assembly of claim 1, wherein the depth of the frame extends from a top of the frame to a bottom of the frame and the first lengthwise frame segment cutout portion extends from the top of the frame to the bottom of the frame.

18. The battery assembly of claim 1, wherein the depth of the frame extends from a top of one of the plurality of intersecting frame segments of the frame to a bottom of the one of the plurality of intersecting frame segments of the frame.

19. The battery assembly of claim 1, wherein the frame comprises a second lengthwise frame segment of the plurality of intersecting frame segments extending along the length of the frame and opposite the first lengthwise frame segment, the second lengthwise frame segment presenting a second lengthwise frame segment peripheral edge having a second lengthwise frame segment cutout portion that is recessed from the second lengthwise frame segment peripheral edge of the frame, such that a cutout portion width of the frame from the first lengthwise frame segment cutout portion to the second lengthwise frame segment cutout portion is less than the width of the frame.

20. The battery assembly of claim 10, wherein the depth of the frame extends from a top of the frame to a bottom of the frame.

21. The battery assembly of claim 10, wherein the depth of the frame extends from a top of one of the plurality of intersecting frame segments of the frame to a bottom of the one of the plurality of intersecting frame segments of the frame.

22. The battery assembly of claim 10, wherein the second lengthwise frame segment of the plurality of intersecting frame segments is opposite the first lengthwise frame segment, and a cutout portion width of the frame from the first lengthwise frame segment cutout portion to the second lengthwise frame segment cutout portion is less than the width of the frame.

23. The battery assembly of claim 1, wherein the length of the frame, the width of the frame, and the depth of the frame are orthogonal to each other.

24. The battery assembly of claim 10, wherein the length of the frame, the width of the frame, and the depth of the frame are orthogonal to each other.

* * * * *